United States Patent
Delfort et al.

(10) Patent No.: US 10,710,021 B2
(45) Date of Patent: Jul. 14, 2020

(54) POLYAMINES, SYNTHESIS PROCESS THEREOF AND USE OF SAME FOR THE SELECTIVE ELIMINATION OF H$_2$S FROM A GASEOUS EFFLUENT COMPRISING CO$_2$

(71) Applicant: IFP Energies nouvelles, Rueil-Malmaison (FR)

(72) Inventors: Bruno Delfort, Paris (FR); Antoine Nicola, Lyons (FR); Thierry Huard, Saint Symphorien D'ozon (FR); Aurelie Wender, Rueil-Malmaison (FR); Catherine Lefebvre, Le Pecq (FR); Nicolas Laloue, Lyons (FR); Karine Gaillard, Lyons (FR)

(73) Assignee: IFP Energies nouvelles, Rueil-Malmaison (FR)

( * ) Notice: Subject to any disclaimer, the term of this patent is extended or adjusted under 35 U.S.C. 154(b) by 220 days.

(21) Appl. No.: 16/060,819

(22) PCT Filed: Dec. 5, 2016

(86) PCT No.: PCT/EP2016/079779
§ 371 (c)(1),
(2) Date: Jun. 8, 2018

(87) PCT Pub. No.: WO2017/097716
PCT Pub. Date: Jun. 15, 2017

(65) Prior Publication Data
US 2018/0369743 A1    Dec. 27, 2018

(30) Foreign Application Priority Data
Dec. 11, 2015 (FR) ...................... 15 62247

(51) Int. Cl.
*B01D 53/14* (2006.01)
*C08G 73/02* (2006.01)
(Continued)

(52) U.S. Cl.
CPC ..... *B01D 53/1462* (2013.01); *B01D 53/1468* (2013.01); *B01D 53/1493* (2013.01);
(Continued)

(58) Field of Classification Search
None
See application file for complete search history.

(56) References Cited

U.S. PATENT DOCUMENTS 4,013,787 A    3/1977  Varlerberghe

FOREIGN PATENT DOCUMENTS

WO    2014001669 A1    1/2014

OTHER PUBLICATIONS

International Search Report PCT/EP2016/079779 dated Feb. 23, 2017.

*Primary Examiner* — Anita Nassiri-Motlagh
(74) *Attorney, Agent, or Firm* — Millen, White, Zelano and Branigan, P.C.

(57) ABSTRACT

The invention concerns novel polyamines having formula (I) obtained from the reaction between a polyol diglycidylether and piperazine:

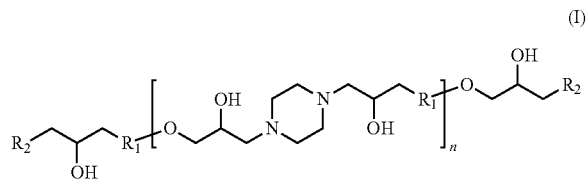

in which n is a whole number between 0 and 30, R$_1$ has different forms, R$_2$ has formula (g$_5$), and R$_2$ has formula (g$_6$) when n=0

(Continued)

(A1)

(A2)

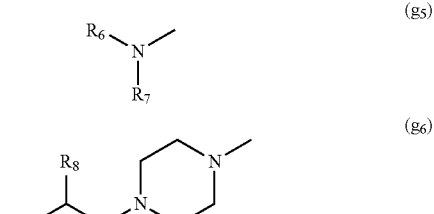

(g5)

(g6)

$R_6$: H, C1-C6 alkyl or hydroxyalkyl radical,
$R_7$: C1-C6 alkyl or hydroxyalkyl radical,
$R_6$ and $R_7$ may be connected together to form a heterocycle having 5, 6, 7 or 8 atoms when
$R_6$ is other than H,
$R_8$: H, C1-C4 alkyl or hydroxyalkyl radical.

The invention also concerns their preparation method and their use in an absorbing solution based on amines in order to selectively eliminate $H_2S$ from a gaseous effluent containing $H_2S$ and $CO_2$.

16 Claims, 3 Drawing Sheets

(51) Int. Cl.
*C10L 3/10* (2006.01)
*C08G 73/06* (2006.01)
(52) U.S. Cl.
CPC ....... *C08G 73/024* (2013.01); *C08G 73/0273* (2013.01); *C08G 73/0633* (2013.01); *C10L 3/102* (2013.01); *C10L 3/103* (2013.01); *B01D 2252/103* (2013.01); *B01D 2252/20405* (2013.01); *B01D 2252/20415* (2013.01); *B01D 2252/20426* (2013.01); *B01D 2252/20431* (2013.01); *B01D 2252/504* (2013.01); *C10L 2290/541* (2013.01)

POLYAMINES, SYNTHESIS PROCESS THEREOF AND USE OF SAME FOR THE SELECTIVE ELIMINATION OF H₂S FROM A GASEOUS EFFLUENT COMPRISING CO₂

FIELD OF THE INVENTION

The present invention relates to novel nitrogen-containing compounds belonging to the polyamine family, obtained from the reaction between a polyol diglycidylether and piperazine. The invention also relates to the process for the synthesis of said compounds, as well as to their use in a process for the deacidification of a gaseous effluent, such as gas of industrial origin or natural gas.

General Context

Absorption processes employing an aqueous solution of amines for removing acid compounds, in particular carbon dioxide ($CO_2$), hydrogen sulphide ($H_2S$), carbon oxysulphide (COS), carbon disulphide ($CS_2$), sulphur dioxide ($SO_2$) and mercaptans (RSH), present in a gas are in routine use. The gas is deacidified by contact with the absorbing solution in an absorption column ("absorber"), then the absorbing solution is thermally regenerated in a regeneration column ("regenerator"). A gas which is depleted in acid compounds is then produced in the absorber, and a gas which is rich in acid compounds leaves the regenerator. The document U.S. Pat. No. 6,852,144 describes, for example, a method for the elimination of acid compounds from hydrocarbons. The method uses a water/N-methyldiethanolamine (MDEA) or water/triethanolamine absorbing solution containing a high proportion of at least one compound belonging to the following group: piperazine, methylpiperazine and morpholine.

A limitation of absorbing solutions which are in routine use in deacidification applications is an insufficient selectivity for the absorption of $H_2S$ compared with $CO_2$. In fact, in certain cases of the deacidification of natural gas, a selective elimination of the $H_2S$ is focussed upon by limiting the absorption of $CO_2$ as far as is possible. This constraint is particularly important for gases to be treated which already have a $CO_2$ content which is less than or equal to the desired specification. Thus, a maximum $H_2S$ absorption capacity with a maximum $H_2S$ absorption selectivity compared with $CO_2$ is aimed for. This selectivity means that an acid gas can be recovered from the regenerator outlet having as high a concentration of $H_2S$ as possible, which limits the size of the units of the sulphur line downstream of the treatment and ensures better operation. In certain cases, a $H_2S$ enrichment unit is necessary in order to concentrate the acid gas in $H_2S$. In this case, the absorbing solution with the best possible selectivity is also sought. Tail gas treatment units also require a selective elimination of $H_2S$, which is returned upstream of the sulphur line.

It is well known to the person skilled in the art that tertiary amines or secondary amines with a severe steric hindrance have slower $CO_2$ capture kinetics than primary amines or secondary amines which are less hindered. In contrast, tertiary amines or secondary amines with a severe steric hindrance have instantaneous $H_2S$ capture kinetics, which means that selective elimination of the $H_2S$ can be carried out on the basis of the distinct kinetic performances.

In 1950, Frazier and Kohl (Ind. and Eng. Chem., 42, 2288) in particular demonstrated that the tertiary amine which is N-methyldiethanolamine (MDEA) has a high degree of absorption selectivity for $H_2S$ compared with $CO_2$ because of the distinct kinetic performances of this amine in respect of these two gases. However, there are cases in which MDEA cannot be used to obtain the desired $H_2S$ absorption capacity and in which the selectivity is insufficient. Thus, using MDEA to treat gases containing high partial pressures of $CO_2$ and $H_2S$, as is the case with certain natural gases, for example, is of limited interest. The case is the same when the $H_2S$ contents have to be reduced to low partial pressures, for example in the context of the treatment of refinery tail gas or synthesis gases.

The U.S. Pat. Nos. 4,405,581, 4,405,582 and 4,405,583 disclose the use of absorbing solutions based on hindered secondary amines for the selective elimination of $H_2S$ in the presence of $CO_2$. The U.S. Pat. No. 4,405,811 discloses the use of hindered tertiary aminoether alcohols, and the U.S. Pat. No. 4,483,833 discloses the use of heterocyclic aminoalcohols and aminoether alcohols in order to eliminate $H_2S$ from a gaseous mixture comprising $H_2S$ and $CO_2$. Overall, these patents describe improved performances in terms of selectivity and capacity compared with N-methyldiethanolamine. These amines show a very clear advantage over MDEA for applications employing gases with low partial pressures of acid gases. The use of these hindered amines remains, however, limited for higher pressures of acid gas, as is the case for the majority of natural gas treatment applications. The gains in absorption capacity may be reduced when the partial pressure of acid gas increases, and all the more so since control of the temperature in the absorber imposes a limited acid gas loading level at the bottom of the absorber. Finally, the size of the natural gas treatment units, employing several hundred tonnes of amine, often renders the use of a solvent based on these complex amines very expensive.

It is also well known to the person skilled in the art that the partial neutralization of a solution of MDEA by the addition of a small quantity of phosphoric or sulphuric acid or other acids or ammonium salts can be used to reduce the energy consumption at the reboiler for the regeneration of the solution of amines, or can be used to obtain lower $H_2S$ contents in the treated gas by reducing the loading level of acid compounds for the regenerated amine returned to the head of the absorber. This type of formulation is described, for example, in patent FR 2 313 968 B1 or the patent application EP 134 948 A2. The document EP 134 948 A2 indicates that this type of formulation can be used to reduce the number of trays in the absorber for a given $H_2S$ absorption specification, this reduction meaning that $CO_2$ absorption can be limited, and thus the selectivity can be improved. However, a quantification of this improvement is not indicated. Furthermore, protonation of the amine by an acid such as that described, for example, in EP 134 948 A2, may have a negative effect in the top of the absorber where the approach to equilibrium is critical, which may in some cases result in the opposite effect and result in increasing the number of trays or increasing the flow rate of the circulating solvent (van den Brand et al, Sulphur 2002, 27-30 Oct. 2002).

The use of an organic solvent mixed with a hindered secondary amine or tertiary amine which might contain water is also known to be able to improve the absorption selectivity of $H_2S$ compared with $CO_2$, as described, for example, in patent application FR 2 485 945 or in presentations regarding the Sulfinol process (Huffmaster and Nasir, Proceedings of the 74th GPA Annual Convention. Gas Treating and Sulfur Recovery. 1995, 133). The use of organic solvent in concentrations which are typically in the range 2% to 50% (U.S. Pat. No. 4,085,192) or in the range 20% to 50% (patent application FR 2 485 945) provides for an improvement in selectivity in the case of high pressures of acid gases. However, this advantage is counter-balanced by a higher co-absorption of the hydrocarbons. For low pressures of acid gases where the quantity of organic solvent has to be reduced in order to keep the capture level high, the gain in selectivity will also be reduced.

The document FR 2 996 464 describes that the addition of certain organic compounds, in particular added in very small quantities, to a formulation comprising water and at least one hindered tertiary or secondary amine means that the selectivity for absorption during the selective absorption of $H_2S$ as opposed to $CO_2$ of a gaseous effluent comprising $H_2S$ and $CO_2$ can be controlled. By increasing the dynamic viscosity of the aqueous solution in a controlled manner, said organic compound can be used to improve the selectivity for absorption of $H_2S$ compared with $CO_2$. The organic compounds described are, for example, polyols, polyethers, copolymers of ethylene oxide terminated by hydrophobic motifs attached to ethylene oxide groups via urethane groups, partially or completely hydrolysed polyacrylamides, polymers or copolymers comprising monomeric units of the acrylic, methacrylic, acrylamide, acrylonitrile, N-vinylpyridine, N-vinylpyrrolidinone, N-vinylimidazole, or polysaccharide type. These compounds are not amines which are susceptible of reacting with acid compounds such as $CO_2$ of the gas to be treated, as is the case with the hindered tertiary or secondary amine of the absorbing solution.

However, the inventors have discovered that the addition of viscosifying organic compounds has a variable effect on the $CO_2$ absorption kinetics which depends on the nature of the organic compound used. It thus remains difficult to predict and optimize the absorption selectivity for $H_2S$ of a gaseous effluent containing $CO_2$ by an amine absorbing solution and a viscosifying organic compound solely on the basis of viscosity.

DESCRIPTION OF THE INVENTION

Aims and Summary of the Invention

The particular aim of the present invention is to provide compounds which can be used in formulations of absorbing solutions based on amines which are employed in the deacidification of gas, for a selective elimination of $H_2S$ compared with $CO_2$, overcoming the problems of the prior art presented hereinabove.

Novel nitrogen-containing compounds belonging to the polyamine family and obtained from the reaction between a polyol diglycidylether and piperazine, may advantageously be used in the field of gas deacidification.

The inventors have demonstrated that the viscosifying compounds used to limit the absorption of $CO_2$ are not equivalent in terms of performances when used in absorbing solution formulations for an industrial process for the selective elimination of $H_2S$ in gases containing $CO_2$.

The inventors have demonstrated that, unexpectedly, certain compounds belonging to a polyamine family, also known as coamines in the present description, obtained from the reaction between a polyol diglycidylether and piperazine, and in particular added in small quantities to a solution of hindered tertiary or secondary amine, termed the principal amine, could be used to obtain $CO_2$ absorption rates below those obtained with an identical solution of principal amine (hindered tertiary or secondary) without said coamines, or with an identical principal amine solution viscosified by an organic non-amine compound in accordance with the prior art and with a viscosity equivalent to or higher than the principal amine solution mixed with the coamines.

The inventors have demonstrated that the use of polyamines having the general formula (I) given below, obtained from the reaction between a polyol diglycidylether and piperazine, can be used to obtain good performances in terms of the absorption capacity for acid gases and absorption selectivity as regards $H_2S$, in particular an adsorption selectivity as regards $H_2S$ which is greater than reference amines such as MDEA, in particular by adding these polyamines in small quantities to solutions of the reference amine.

Thus, in a first aspect, the invention concerns a compound belonging to the polyamine family, obtained from the reaction between a polyol diglycidylether and piperazine, and having the following general formula (I):

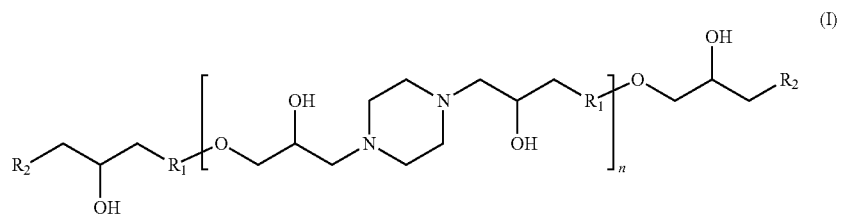

in which:

n is a whole number in the range 0 to 30, the radical $R_1$ is selected from the groups with the following sub-formulae $(g_1)$ to $(g_4)$:

the group with formula $(g_1)$:

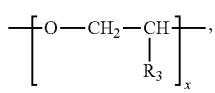

in which:

x is a whole number in the range 1 to 100, preferably in the range 1 to 25, the radical $R_3$ is equally either a hydrogen atom, an alkyl radical or a hydroxyalkyl radical, containing between 1 and 4 carbon atoms, the group with formula $(g_2)$:

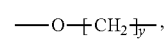

in which y is a whole number in the range 3 to 8, the group with formula ($g_3$):

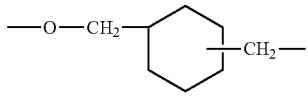

the group with formula ($g_4$):

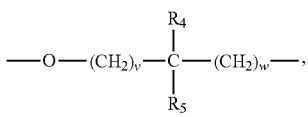

in which:
- v and w are whole numbers, each in the range 1 to 4, with the condition that the sum of v and w is equal to 2, 3, 4 or 5,
- the radical $R_4$ is equally either a hydroxyl group, an alkyl radical or a hydroxyalkyl radical, containing between 1 and 4 carbon atoms, and
- the radical $R_5$ is equally either a hydrogen atom or a hydroxymethyl group (—$CH_2OH$).

the radical $R_2$ has the following formula ($g_5$):

in which:
- the radical $R_6$ is equally either a hydrogen atom, an alkyl radical or a hydroxyalkyl radical, containing between 1 and 6 carbon atoms,
- the radical $R_7$ is equally either an alkyl radical or a hydroxyalkyl radical, containing between 1 and 6 carbon atoms,
- the radicals $R_6$ and $R_7$ may be connected together via a covalent bond or via a heteroatom in order to form a heterocycle having 5, 6, 7 or 8 atoms when the radical $R_6$ is not a hydrogen atom, and in which, when n is equal to 0, the radicals $R_6$ and $R_7$ are connected together to form a piperazine cycle, the radical $R_2$ having the formula ($g_6$) below:

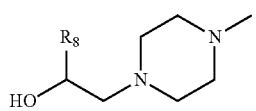

in which the radical $R_8$ is equally either a hydrogen atom, an alkyl radical or a hydroxyalkyl radical, containing between 1 and 4 carbon atoms.

Preferably, the radicals $R_6$ and $R_7$ are connected together via a covalent bond or via a heteroatom in order to form a heterocycle having 5, 6, 7 or 8 atoms when the radical $R_6$ is not a hydrogen atom.

In this case, the heterocycle may be a piperazine cycle.

In particular, the radical $R_2$ may then have the formula ($g_6$).

In a second aspect, the invention pertains to a process for the synthesis of a compound with general formula (I).

In accordance with a first embodiment, the synthesis process comprises the following reactions:
- a first reaction for addition or polyaddition of a polyol diglycidylether having formula (IV) with piperazine having formula (V) in order to form an intermediate compound having formula (VI),

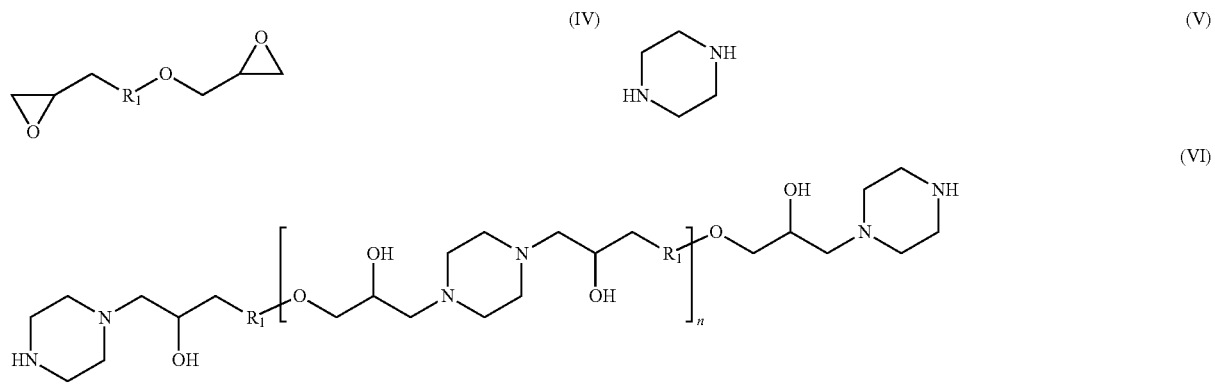

$R_1$ being as defined in the general formula (I), said piperazine being in molar excess with respect to said polyol diglycidylether,

- a second reaction for addition of said intermediate compound having formula (VI) with monoepoxide having general formula (VII)

in order to produce at least one nitrogen-containing compound in accordance with the invention.

In accordance with a second embodiment, the synthesis process comprises the following reactions:
- a first reaction for addition or polyaddition of a polyol diglycidylether having formula (IV) with piperazine having formula (V) in order to form an intermediate compound having formula (VI),

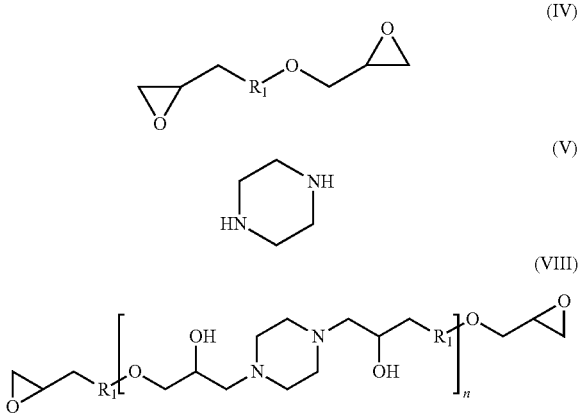

R₁ being as defined in the general formula (I), said polyol diglycidylether being in molar excess with respect to said piperazine, a second reaction for addition of said intermediate compound having formula (VIII) with an amine having general formula (IX)

the radicals $R_6$ and $R_7$ being as defined in the general formula (I), in order to produce at least one nitrogen-containing compound in accordance with the invention.

In particular, the first reaction and the second reaction may be carried out in two successive steps.

Alternatively, the first reaction and the second reaction may be carried out in a single step.

Preferably, the polyol diglycidylether having formula (IV) for the first reaction is selected from the list constituted by:
ethylene glycol diglycidylether;
diethylene glycol diglycidylether;
triethylene glycol diglycidylether;
polyethylene glycol diglycidylether with a molar mass in the range 200 to 2000 g/mole;
the diglycidylether of copolymers of ethylene glycol and propylene glycol with a molar mass in the range 200 to 2000 g/mole;
1,3-propanediol diglycidylether;
1,4-butanediol diglycidylether;
1,5-pentanediol diglycidylether;
1,6-hexanediol diglycidylether;
1,8-octanediol diglycidylether;
neopentyl glycol diglycidylether;
1,4-cyclohexanedimethanol diglycidylether;
1,3-cyclohexanedimethanol diglycidylether;
1,2-cyclohexanedimethanol diglycidylether;
glycerol diglycidylethers;
trimethylolethane diglycidylethers;
trimethylolpropane diglycidylethers;
pentaerythritol diglycidylethers;
sorbitol diglycidylethers.

Preferably, the secondary amine having formula (IX) is selected equally from the group constituted by:
dimethylamine;
diethylamine;
2-amino-2-methyl-1-propanol;
tris(hydroxymethyl)aminomethane;
morpholine;
N-methylpiperazine;
N-hydroxyethylpiperazine;
N-2-hydroxypropylpiperazine;
diethanolamine;
N-methylaminoethanol.

Preferably, the monoepoxide having formula (VII) is selected equally from the group constituted by:
1,2-epoxyethane;
1,2-epoxypropane;
1,2-epoxybutane;
glycidol.

In a third aspect, the invention concerns a selective process for the elimination of $H_2S$ compared with $CO_2$ from a gaseous effluent comprising $H_2S$ and $CO_2$, in which a step for absorption of the acid compounds is carried out by bringing the gaseous effluent into contact with an absorbing solution comprising:
(a) water,
(b) at least one principal nitrogen-containing compound comprising at least one tertiary amine function or secondary amine function comprising two secondary carbons in the α and α' position of the nitrogen atom or at least one tertiary carbon in the alpha or beta position of the nitrogen atom, and
(c) at least one auxiliary nitrogen-containing compound in accordance with the invention, or susceptible of being obtained by a synthesis process in accordance with the invention.

Preferably, the absorbing solution comprises:
a fraction by weight of water in the range 3.5% to 94.5% by weight of the absorbing solution, preferably in the range 39.5% to 79.5% by weight,
a fraction by weight of the principal nitrogen-containing compound in the range 5% to 95% by weight of the absorbing solution, preferably in the range 20% to 60% by weight,
a fraction by weight of the auxiliary nitrogen-containing compound in the range 0.5% to 25% by weight of the absorbing solution, preferably in the range 1% to 10% by weight, the fraction by weight of the principal nitrogen-containing compound being higher than that of the auxiliary nitrogen-containing compound.

Preferably, the principal nitrogen-containing compound is selected from the group constituted by:
N-methyldiethanolamine;
triethanolamine;
diethylmonoethanolamine;
dimethylmonoethanolamine;
ethyldiethanolamine;
tertiary monoalkanolamines of the family of 3-alkoxypropylamines from the list constituted by N-methyl-N-(3-methoxypropyl)-2-aminoethanol, N-methyl-N-(3-methoxypropyl)-1-amino-2-propanol, N-methyl-N-(3-methoxypropyl)-1-amino-2-butanol, N-ethyl-N-(3-methoxypropyl)-2-aminoethanol, N-ethyl-N-(3-methoxypropl)-1-amino-2-propanol, N-ethyl-N-(3-methoxypropyl)-1-amino-2-butanol, N-isopropyl-N-(3-methoxypropyl)-2-aminoethanol, N-isopropyl-N-(3-methoxypropyl)-1-amino-2-propanol, and N-isopropyl-N-(3-methoxypropyl)-1-amino-2-butanol;
diamines from the list constituted by 1,2-bis(2-dimethylaminoethoxy)ethane, 1,2-bis(2-diethylaminoethoxy)ethane and 1,2-bis(2-pyrolidinoethoxy)ethane;
diamines of the 1,3-diamino-2-propanol family from the list constituted by 1,3-bis(dimethylamino)-2-propanol, (1-dimethylamino-3-tert-butylamino)-2-propanol, 1,3-bis (tert-butylamino)-2-propanol, 1,3-bis(diethylamino)-2-propanol, 1,3-bis(methylamino)-2-propanol, 1,3-bis(ethylmethylamino)-2-propanol, 1,3-bis(n-propylamino)-2-propanol, 1,3-bis(isopropylamino)-2-propanol, 1,3-bis(n-butylamino)-2-propanol, 1,3-bis(isobutylamino)-2-propanol, 1,3-bis(piperidino)-2-propanol, 1,3-bis(pyrrolidino)-2-propanol and N,N,N'-trimethyl-N'-hydroxyethyl-1,3-diamino-2-propanol;

dihydroxyalkylamines from the list constituted by N-(2'-hydroxyethyl)-2-amino-2-methyl-1-propanol, N-(2'-hydroxypropyl)-2-amino-2-methyl-1-propanol, N-(2'-hydroxybutyl)-2-amino-2-methyl-1-propanol, (N-methyl-N-hydroxyethyl)-3-amino-2-butanol;

diamines of the family of bis(amino-3-propyl)ethers or (amino-2-ethyl)-(amino-3-propyl)ethers from the list constituted by bis(dimethylamino-3-propyl)ether, bis(diethylamino-3-propyl) ether, (dimethylamino-2-ethyl)-(dimethylamino-3-propyl) ether, (diethylamino-2-ethyl)-(dimethylamino-3-propyl) ether, (dimethylamino-2-ethyl)-(diethylamino-3-propyl) ether, (diethylamino-2-ethyl)-(diethylamino-3-propyl) ether;

beta-hydroxylated tertiary diamines from the list constituted by 1-dimethylamino-3-(2-dimethylaminoethoxy)-2-propanol, 1,1'-oxybis[3-(dimethylamino)-2-propanol], N,N,N',N'-(tetramethyl)-1,6-diamino-2,5-hexanediol, N,N,N',N'-(tetramethyl)-1,7-diamino-2,6-heptanediol, N,N,N',N'-(tetramethyl)-1,8-diamino-2,7-octanediol, N,N,N',N'-(tetramethyl)-1,9-diamino-2,8-nonanediol, N,N,N',N'-(tetramethyl)-1,10-diamino-2,9-decanediol;

di-(2-hydroxyalkyl) monoamines from the list constituted by 1-[(2-hydroxyethyl)methylamino]-2-methyl-2-propanol, 1,1'-(methylimino)-bis-[2-methyl-2-propanol], 2-[(2-hydroxy-2-methylpropyl)amino]-2-methyl-1-propanol, 2-[(2-hydroxy-2-methylpropyl)amino]-1-butanol, bis(2-hydroxy-2-methylpropyl)amine;

hindered tertiary 4-(aminoethyl)-morpholines from the list constituted by 1-(4-morpholino)-2-(methylisopropylamino) ethane, 1-(4-morpholino)-2-(methyltert-butylamino) ethane, 1-(4-morpholino)-2-(diisopropylamino) ethane, 1-(4-morpholino)-2-(1-piperidinyl) ethane;

diamines from the list constituted by (N-morpholinoethyl) isopropylamine, (N-piperidinoethyl) isopropylamine, (N-morpholinoethyl) tert-butylamine;

amines from the family of N-alkyl-3-hydroxypiperidines and N-alkyl-4-hydroxypiperidines from the list constituted by N-methyl-4-hydroxypiperidine, N-ethyl-3-hydroxypiperidine, N-methyl-3-hydroxypiperidine;

alkylaminopiperazines, namely 1-methyl-4-(3-dimethylaminopropyl) piperazine, 1-ethyl-4-(diethylaminoethyl) piperazine.

The absorbing solution may furthermore comprise a physical solvent selected from the group constituted by methanol, ethanol, 2-ethoxyethanol, benzyl alcohol, triethylene glycol dimethylether, tetraethylene glycol dimethylether, pentaethylene glycol dimethylether, hexaethylene glycol dimethylether, heptaethylene glycol dimethylether, octaethylene glycol dimethylether, diethylene glycol butoxyacetate, glycerol triacetate, sulpholane, N-methylpyrrolidone, N-methylmorpholin-3-one, N,N-dimethylformamide, N-formyl-morpholine, N,N-dimethyl-imidazolidin-2-one, N-methylimidazole, ethylene glycol, diethylene glycol, triethylene glycol, thiodiglycol, tributylphosphate, and propylene carbonate.

The gaseous effluent may be selected from natural gas, synthesis gases, refinery gases, acid gases obtained from an amines unit, gases obtained from a Claus process tail reduction unit, biomass fermentation gases.

Other aims and advantages of the invention will become apparent from the following description of examples of particular embodiments of the invention, given by way of non-limiting examples; the description will also make reference to the accompanying figures described below.

Figure 1:
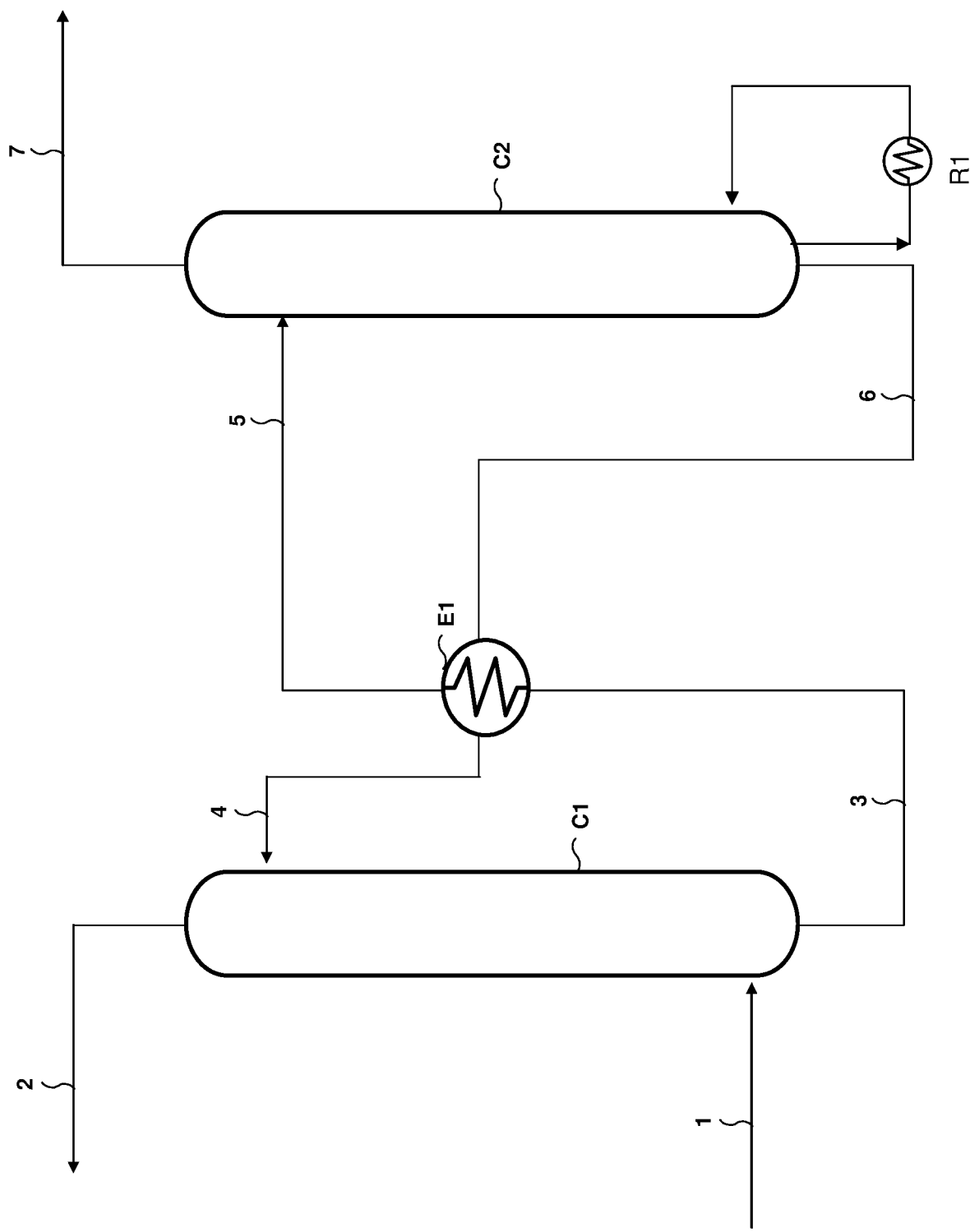
FIG. 1 represents a flow sheet for an embodiment of a process for the treatment of acid gases.

In the figures illustrating the preparation of the nitrogen-containing compounds in accordance with the invention, the arrows represent the steps of the reaction. These are reaction schemes. The illustrations of the synthesis process in accordance with the invention do not include all of the components which are necessary in order to carry it out. Only the elements necessary for comprehension of the invention are shown therein; the person skilled in the art will be capable of completing this representation in order to carry out the invention.

DETAILED DESCRIPTION OF THE INVENTION

The novel nitrogen-containing compounds in accordance with the invention are polyamines obtained from the reaction between a polyol diglycidylether and piperazine, and having the following general formula (I):

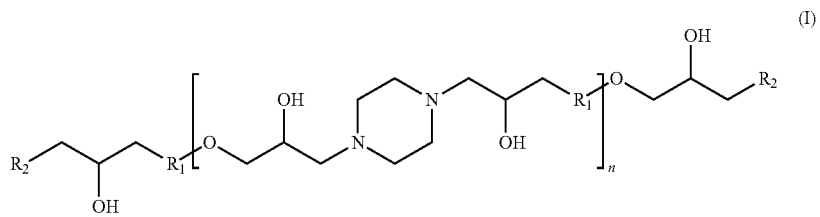

in which:

n is a whole number in the range 0 to 30, the radical $R_1$ is selected from the groups with the following sub-formulae ($g_1$) to ($g_4$):

the group with formula ($g_1$):

$$-\left[O-CH_2-\underset{R_3}{CH}\right]_x-,$$

in which:

x is a whole number in the range 1 to 100, preferably in the range 1 to 25, and the radical $R_3$ is selected equally either from a hydrogen atom, an alkyl radical containing between 1 and 4 carbon atoms, and a hydroxyalkyl radical containing between 1 and 4 carbon atoms.

the group with formula ($g_2$):

$$-O-[CH_2]_y-,$$

in which y is a whole number in the range 3 to 8 the group with formula ($g_3$):

$$-O-CH_2-\underset{}{\bigcirc}-CH_2-$$

the group with formula ($g_4$):

$$-O-(CH_2)_v-\underset{R_5}{\overset{R_4}{C}}-(CH_2)_w-,$$

in which:

v and w are whole numbers, each in the range 1 to 4, with the condition that the sum of v and w is equal to 2, 3, 4 or 5, the radical $R_4$ is selected equally either from a hydroxyl group, an alkyl radical containing between 1 and 4 carbon atoms, and a hydroxyalkyl radical containing between 1 and 4 carbon atoms, and the radical $R_5$ is selected equally either from a hydrogen atom and a hydroxymethyl group (—$CH_2OH$), the radical $R_2$ has the following formula ($g_5$):

$$R_6\diagdown\underset{R_7}{N}\diagup$$

in which:

the radical $R_6$ is selected equally either from a hydrogen atom, an alkyl radical containing between 1 and 6 carbon atoms, and a hydroxyalkyl radical containing between 1 and 6 carbon atoms, the radical $R_7$ is selected equally either from an alkyl radical containing between 1 and 6 carbon atoms, and a hydroxyalkyl radical containing between 1 and 6 carbon atoms, and the radicals $R_6$ and $R_7$ may be connected together via a covalent bond or via a heteroatom in order to form a heterocycle having 5, 6, 7 or 8 atoms when the radical $R_6$ is not a hydrogen atom.

When the heterocycle is a piperazine cycle, the radical $R_2$ may have the following formula ($g_6$):

$$\underset{HO}{\overset{R_8}{\diagdown}}\diagdown\underset{}{N}\diagdown\underset{}{N}\diagup$$

with the radical $R_8$ selected equally either from a hydrogen atom, an alkyl radical containing between 1 and 4 carbon atoms, and a hydroxyalkyl radical containing between 1 and 4 carbon atoms.

In the general formula (I), when n is equal to 0, the radicals $R_6$ and $R_7$ are connected together to form a piperazine cycle. In this case, the radical $R_2$ has the formula ($g_6$) given above.

Depending on the form taken by the radical $R_2$, more precisely, the general formula (I) may be written in accordance with one of the formulae (II) and (III) below:

(II)

[Chemical structure showing a long chain molecule with multiple piperazine and hydroxyl groups, with $R_6$, $R_1$, $R_8$ substituents and indexed by n]

in which the radical $R_2$ has the formula ($g_6$) given above,

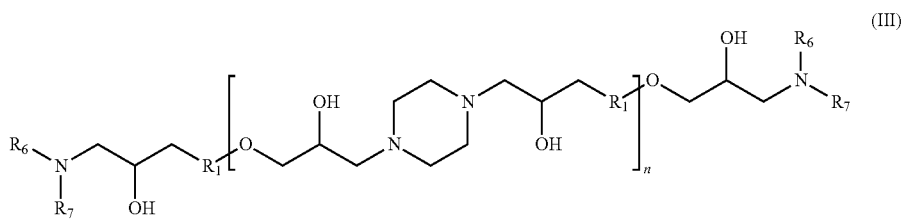
(III)

in which the radical $R_2$ has the formula ($g_5$) given above.

Synthesis of a Compound in Accordance with the Invention

The nitrogen-containing compounds in accordance with the general formula (I) may be synthesised using any pathway permitted by organic chemistry.

Advantageously, the synthesis of the compounds of the invention is based on a first reaction for addition or polyaddition between a polyol diglycidylether having the following formula (IV):

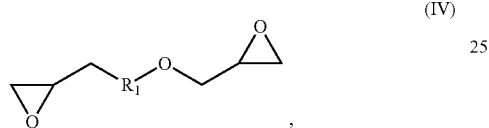
(IV)

and piperazine having the following formula (V):

(V)

This reaction produces the following motif (—X—):

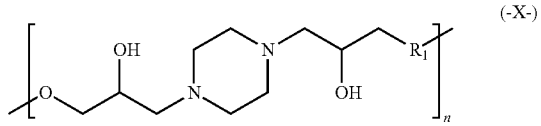
(-X-)

Depending on the relative quantities of piperazine and of polyol diglycidylether employed, two principal synthesis embodiments may be employed in order to prepare the compounds with general formula (I).

The polyol diglycidylether may be selected from the list of compounds constituted by:

ethylene glycol diglycidylether;
diethylene glycol diglycidylether;
triethylene glycol diglycidylether;
polyethylene glycol diglycidylether with a molar mass in the range 200 to 2000 g/mole;
the diglycidylether of copolymers of ethylene glycol and propylene glycol with a molar mass in the range 200 to 2000 g/mole;
1,3-propanediol diglycidylether;
1,4-butanediol diglycidylether;
1,5-pentanediol diglycidylether;
1,6-hexanediol diglycidylether;
1,8-octanediol diglycidylether;
neopentylglycol diglycidylether;
1,4-cyclohexanedimethanol diglycidylether;
1,3-cyclohexanedimethanol diglycidylether;
1,2-cyclohexanedimethanol diglycidylether;
glycerol diglycidylethers;
trimethylolethane diglycidylethers;
trimethylolpropane diglycidylethers;
pentaerythritol diglycidylethers;
sorbitol diglycidylethers.

Figure 2:
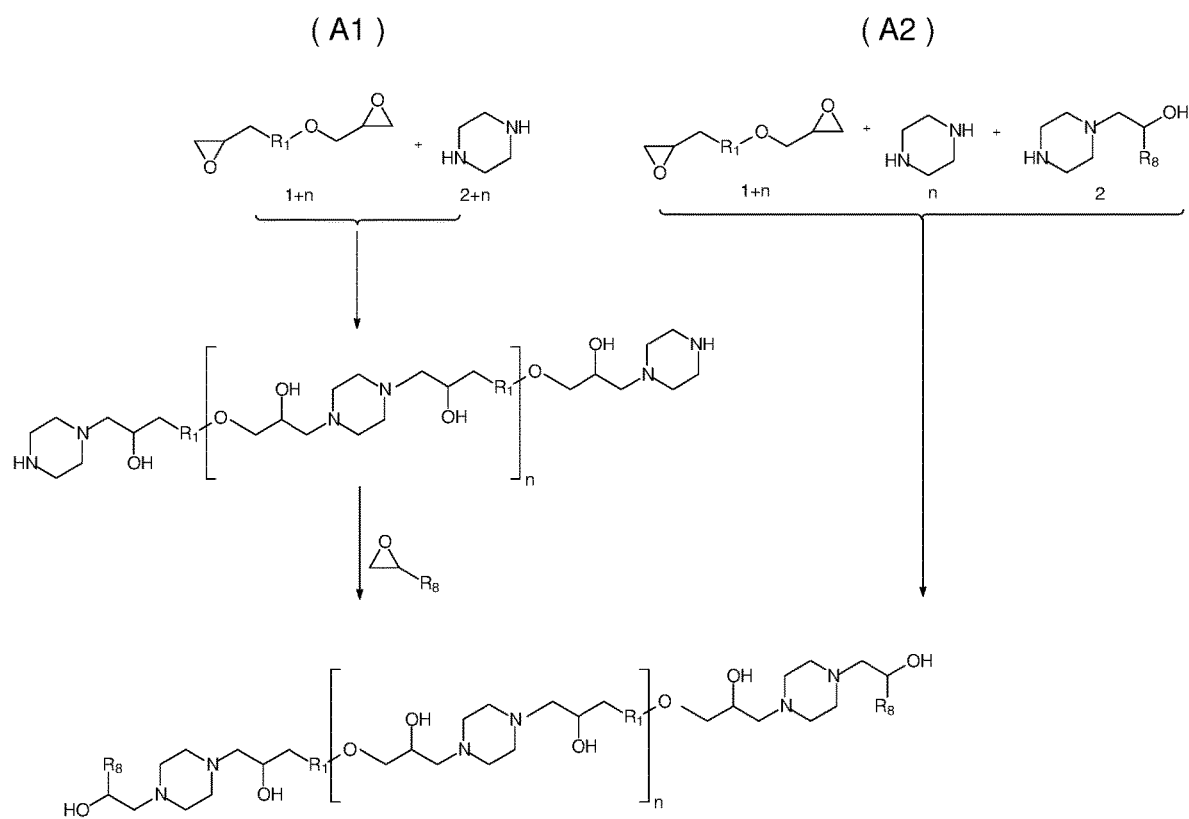
FIG. 2 illustrates a process for the synthesis of a compound in accordance with the invention, in accordance with a first embodiment.

Synthesis of a Compound in Accordance with the Invention in Accordance with a First Embodiment: Synthesis Pathways A1 and A2 (FIG. 2):

FIG. 2 illustrates a first embodiment for the synthesis of the compounds in accordance with the invention, in which a molar excess of piperazine with respect to the polyol diglycidylether is employed.

In this embodiment, the following is carried out:
a first reaction, which is a reaction for addition or polyaddition of a polyol diglycidylether having formula (IV) with a molar excess of piperazine. In this case, the motif (—X—) may be flanked by piperazine chain ends, resulting in the general formula (VI) below:

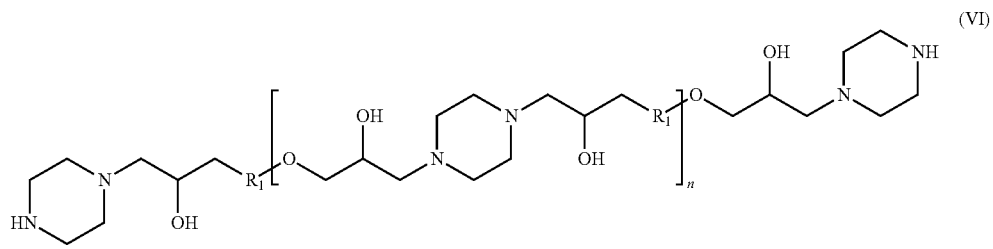
(VI)

in which $R_1$ and n are as defined above in relation to the general formula (I).

The term "molar excess of piperazine with respect to polyol diglycidylether" means the excess which can ensure that the structure (VI) is obtained.

a second reaction, which is an addition reaction between the compound having formula (VI) and a monoepoxide having general formula (VII) below, in order to obtain a compound in accordance with the invention having the general formula (I).

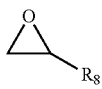
(VII)

In the formula (VII), the radical $R_8$ is defined as above in relation to the general formula ($g_6$).

In a non-limiting manner, this monoepoxide may, for example, be selected from 1,2-epoxyethane, 1,2-epoxypropane, 1,2-epoxybutane or glycidol.

In accordance with this first embodiment, the synthesis may be carried out in two steps (synthesis pathway A1 of FIG. 2) or in one step (synthesis pathway A2 of FIG. 2). In accordance with the pathway A2, a single step is carried out, in which the polyol diglycidylether, the piperazine and the product of the monoaddition of the monoepoxide having formula (VII) with piperazine, which has the formula (VII') below, are reacted simultaneously in order to produce a nitrogen-containing compound in accordance with the general formula (I).

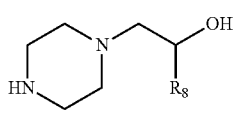
(VII')

Figure 3:
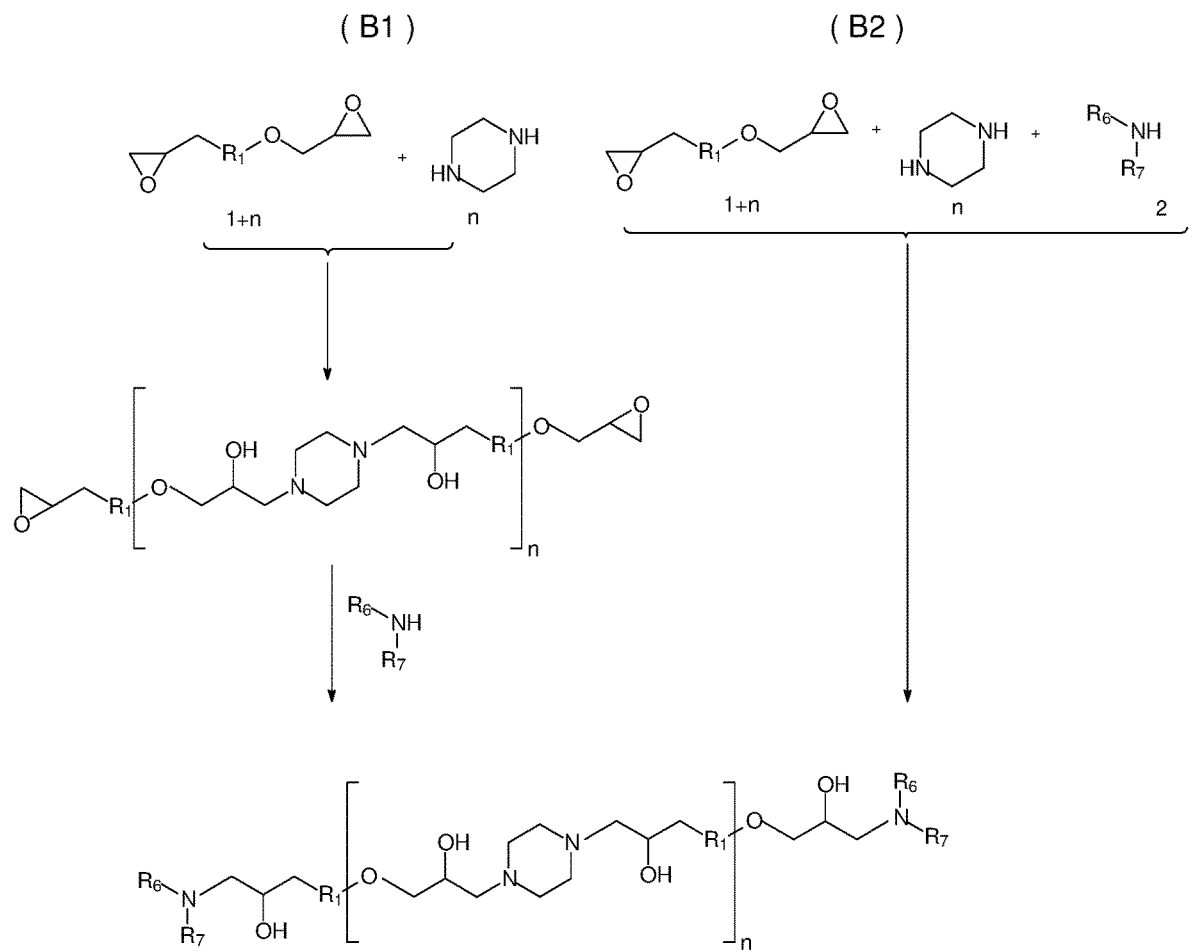
FIG. 3 illustrates a process for the synthesis of a compound in accordance with the invention, in accordance with a second embodiment.

Synthesis of a Compound in Accordance with the Invention in Accordance with a Second Embodiment: Synthesis Pathways B1 and B2 (FIG. 3):

FIG. 3 illustrates a second synthesis embodiment for the compounds in accordance with the invention, in which a molar excess of polyol diglycidylether with respect to piperazine is employed.

In this embodiment, the following is carried out:

a first reaction, which is a reaction for addition or polyaddition of piperazine with a molar excess of a polyol diglycidylether having formula (IV). In this case, the motif (—X—) may be flanked by glycidyl chain ends, leading to the general formula (VIII):

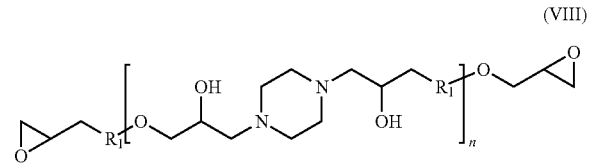
(VIII)

in which $R_1$ and n are as defined above in relation to the general formula (I).

The term "molar excess of polyol diglycidylether with respect to piperazine" means the excess which can ensure that the structure (VIII) is obtained.

a second reaction, which is an addition reaction between the compound having formula (VIII) and an amine having general formula (IX) below, in order to obtain a compound in accordance with the invention having the general formula (I).

(IX)

In the formula (IX), the radicals $R_6$ and $R_7$ are as defined above in relation to the general formula (I).

In a non-limiting manner, this amine may, for example, be selected from dimethylamine, diethylamine, 2-amino-2-methyl-1-propanol, tris(hydroxymethyl)aminomethane, morpholine, N-methylpiperazine, N-hydroxyethylpiperazine, N-2-hydroxypropylpiperazine, diethanolamine and N-methylaminoethanol.

In accordance with this second embodiment, the synthesis may be carried out in two steps (synthesis pathway B1 of FIG. 3) or in one step (synthesis pathway B2 of FIG. 3). In accordance with the pathway B2, a single step is carried out, in which the polyol diglycidylether, the piperazine and the amine having general formula (IX) are reacted simultaneously in order to produce a nitrogen-containing compound in accordance with the general formula (I).

The steps of the various synthesis embodiments are carried out under conditions which are suitable for the described reactions, i.e. the conditions for carrying out said chemical reaction, which generally comprise a given reaction medium and given operating conditions (reaction time, temperature, catalysts etc.). As an example, the reaction between the polyol diglycidylether having formula (IV) and piperazine is preferably carried out at a temperature in the range 0° C. to 140° C., for example between ambient temperature and 140° C., for example at 100° C.

Other steps aimed, for example, at eliminating certain unwanted compounds, such as steps for filtration or distillation, may also be carried out in the various synthesis embodiments described without in any way departing from the scope of the present invention.

Use of Compounds in Accordance with the Invention in the Treatment of Gaseous Effluents The compounds in accordance with the invention may be used in various fields of chemistry, and may advantageously be used in the field of the treatment of gas of industrial origin and natural gas.

The present invention proposes carrying out a selective elimination of $H_2S$ compared with $CO_2$ of a gaseous effluent comprising $H_2S$ and $CO_2$, by using an aqueous solution comprising a principal amine and at least one nitrogen-containing compound having general formula (I). The solution is brought into contact with the gaseous effluent in order to selectively eliminate the $H_2S$ that it contains.

The use of polyamines in accordance with the invention means that, in association with a hindered tertiary or secondary principal amine, good performances can be obtained in terms of selectivity of absorption of $H_2S$ compared with $CO_2$, in particular a higher selectivity than with reference aqueous amine solutions such as N-methyldiethanolamine (MDEA), for an equivalent or higher cyclic capacity for absorption of acid gases, in particular $H_2S$.

The process comprises a step for absorption of the acid compounds by bringing the gaseous effluent into contact with an absorbing solution comprising:

(a) water,
(b) at least one principal nitrogen-containing compound comprising at least one tertiary amine function or secondary amine function comprising two secondary carbons in the α and α' position of the nitrogen atom or at least one tertiary carbon in the alpha or beta position of the nitrogen atom, and (c) at least one auxiliary nitrogen-containing compound in accordance with general formula (I).

Reference will also be made to the expression "hindered secondary amine function" to designate a secondary amine function of a nitrogen-containing compound comprising two secondary carbons in the position α and α' to the nitrogen atom or at least one tertiary carbon in the alpha or beta position to the nitrogen atom.

Here, a tertiary carbon is defined as being a carbon atom bonded to three carbon atoms, and a secondary carbon is defined as being a carbon atom bonded to two carbon atoms.

The term "principal nitrogen-containing compound" or "principal amine" means the nitrogen-containing compound comprising at least one hindered tertiary amine or secondary amine function which does not have the general formula (I). The concentration by weight of the principal compound in the absorbing solution is higher than that of the auxiliary nitrogen-containing compound in accordance with the general formula (I). It should be understood that in the case in which there are a plurality of nitrogen-containing compounds, principal and/or auxiliary, it is the total concentration by weight of said principal nitrogen-containing compounds which is higher than the (total) concentration by weight of auxiliary nitrogen-containing compound(s).

The term "auxiliary nitrogen-containing compound" means the polyamine having general formula (I) obtained by reaction between a polyol diglycidylether and piperazine as described above. The auxiliary nitrogen-containing compound in accordance with the general formula (I) is also known as a coamine in the present description. The auxiliary nitrogen-containing compound has a total concentration by weight which is lower than that of the principal nitrogen-containing compound, and has a viscosifying effect, i.e. it has the effect of increasing the dynamic viscosity of the absorbing solution compared with the same solution in said auxiliary nitrogen-containing compound.

Adding coamines, in particular in small quantities, to an aqueous absorbing solution of a principal amine as defined above means that the absorption of $CO_2$ can be limited, more precisely the rate of absorption of $CO_2$, during contact with the gas to be deacidified, and thus the selective elimination of $H_2S$ compared with $CO_2$ can be improved.

Composition of the Absorbing Solution

The absorbing solution preferably comprises:

a fraction by weight of coamine with general formula (I) in the range 0.5% to 25% by weight of the absorbing solution, preferably in the range 1% to 10% by weight, a fraction by weight of principal amine in the range 5% to 95% by weight of the absorbing solution, preferably in the range 20% to 60% by weight, a fraction by weight of water in the range 3.5% to 94.5% by weight of the absorbing solution, preferably in the range 39.5% to 79.5% by weight, the fraction by weight of the principal amine being higher than that of the polyamines with general formula (I).

If the absorbing solution comprises a plurality of principal amines and/or a plurality of coamines, the ranges of concentration given make reference to the total concentration of principal amines and to the total concentration of coamines.

The ranges of concentration given should be understood to include the limits.

Unless otherwise indicated, the concentrations of the various compounds are expressed as a percentage by weight of the absorbing solution in the present description.

The sum of the fractions by weight, expressed as the % by weight of the various compounds of the absorbing solution, is equal to 100% by weight of the absorbing solution.

Preferably, the principal nitrogen-containing compound is selected from the group constituted by:
N-methyldiethanolamine;
triethanolamine;
diethylmonoethanolamine;
dimethylmonoethanolamine;
ethyldiethanolamine;
tertiary monoalkanolamines of the family of 3-alkoxypropylamines from the list constituted by N-methyl-N-(3-methoxypropyl)-2-aminoethanol, N-methyl-N-(3-methoxypropyl)-1-amino-2-propanol, N-methyl-N-(3-methoxypropyl)-1-amino-2-butanol, N-ethyl-N-(3-methoxypropyl)-2-aminoethanol, N-ethyl-N-(3-methoxypropyl)-1-amino-2-propanol, N-ethyl-N-(3-methoxypropyl)-1-amino-2-butanol, N-isopropyl-N-(3-methoxypropyl)-2-aminoethanol, N-isopropyl-N-(3-methoxypropyl)-1-amino-2-propanol, and N-isopropyl-N-(3-methoxypropyl)-1-amino-2-butanol;
diamines from the list constituted by 1,2-bis(2-dimethylaminoethoxy)ethane, 1,2-bis(2-diethylaminoethoxy)ethane and 1,2-bis(2-pyrolidinoethoxy)ethane;
diamines from the 1,3-diamino-2-propanol family from the list constituted by 1,3-bis(dimethylamino)-2-propanol, (1-dimethylamino-3-tert-butylamino)-2-propanol, 1,3-bis(tert-butylamino)-2-propanol, 1,3-bis(diethylamino)-2-propanol, 1,3-bis(methylamino)-2-propanol, 1,3-bis(ethylmethylamino)-2-propanol, 1,3-bis(n-propylamino)-2-propanol, 1,3-bis(isopropylamino)-2-propanol, 1,3-bis(n-butylamino)-2-propanol, 1,3-bis(isobutylamino)-2-propanol, 1,3-bis(piperidino)-2-propanol, 1,3-bis(pyrrolidino)-2-propanol and N,N,N'-trimethyl-N'-hydroxyethyl-1,3-diamino-2-propanol;
dihydroxyalkylamines from the list constituted by N-(2'-hydroxyethyl)-2-amino-2-methyl-1-propanol, N-(2'-hydroxypropyl)-2-amino-2-methyl-1-propanol, N-(2'-hydroxybutyl)-2-amino-2-methyl-1-propanol, (N-methyl-N-hydroxyethyl)-3-amino-2-butanol;
diamines of the family of bis(amino-3-propyl)ethers or (amino-2-ethyl)-(amino-3-propyl)ethers from the list constituted by bis(dimethylamino-3-propyl)ether, bis(diethylamino-3-propyl) ether, (dimethylamino-2-ethyl)-(dimethylamino-3-propyl) ether, (diethylamino-2-ethyl)-(dimethylamino-3-propyl) ether, (dimethylamino-2-ethyl)-(diethylamine-3-propyl) ether, (diethylamino-2-ethyl)-(diethylamino-3-propyl) ether;
beta-hydroxylated tertiary diamines from the list constituted by 1-dimethylamino-3-(2-dimethylaminoethoxy)-2-propanol, 1,1'-oxybis[3-(dimethylamino)-2-propanol], N,N,N',N'-(tetramethyl)-1,6-diamino-2,5-hexanediol, N,N,N',N'-(tetramethyl)-1,7-diamino-2,6-heptanediol, N,N,N',N'-(tetramethyl)-1,8-diamino-2,7-octanediol, N,N,N',N'-(tetramethyl)-1,9-diamino-2,8-nonanediol, N,N,N',N'-(tetramethyl)-1,10-diamino-2,9-decanediol;
di-(2-hydroxyalkyl) monoamines from the list constituted by 1-[(2-hydroxyethyl)methylamino]-2-methyl-2-propanol, 1,1'-(methylimino)-bis-[2-methyl-2-propanol], 2-[(2-hydroxy-2-methylpropyl)amino]-1-butanol, bis(2-hydroxy-2-methylpropyl)amino;
hindered tertiary 4-(aminoethyl)-morpholines from the list constituted by 1-(4-morpholino)-2-(methylisopropylamino) ethane, 1-(4-morpholino)-2-(methyltert-butylamino) ethane, 1-(4-morpholino)-2-(diisopropylamino) ethane, 1-(4-morpholino)-2-(1-piperidinyl) ethane;

diamines from the list constituted by (N-morpholinoethyl) isopropylamine, (N-piperidinoethyl) isopropylamine, (N-morpholinoethyl) tert-butylamine;

amines from the family of N-alkyl-3-hydroxypiperidines and N-alkyl-4-hydroxypiperidines from the list constituted by N-methyl-4-hydroxypiperidine, N-ethyl-3-hydroxypiperidine, N-methyl-3-hydroxypiperidine;

alkylaminopiperazines, namely 1-methyl-4-(3-dimethylaminopropyl) piperazine, 1-ethyl-4-(diethylaminoethyl) piperazine.

In accordance with one embodiment, the absorbing solution may contain organic compounds which are not reactive as regards the acid compounds (conventionally known as "physical solvents"), which can be used to increase the solubility of at least one or more of the acid compounds of the gaseous effluent. As an example, the absorbing solution may comprise in the range 5% to 50% by weight of physical solvent such as alcohols, ethers, ether alcohols, glycol ethers and polyethylene glycol, glycol thioethers, glycol and polyethylene glycol esters and alkoxyesters, glycerol esters, lactones, lactams, N-alkylated pyrrolidones, derivatives of morpholine, of morpholin-3-one, imidazoles and imidazolidinones, N-alkylated piperidones, cyclotetramethylenesulphones, N-alkylformamides, N-alkylacetamides, ether-ketones, alkyl carbonates or alkyl phosphates, and their derivatives.

By way of non-limiting example, it may be methanol, ethanol, 2-ethoxyethanol, benzyl alcohol, triethylene glycol dimethylether, tetraethylene glycol dimethylether, pentaethylene glycol dimethylether, hexaethylene glycol dimethylether, heptaethylene glycol dimethylether, octaethylene glycol dimethylether, diethylene glycol butoxyacetate, glycerol triacetate, sulpholane, N-methylpyrrolidone, N-methylmorpholin-3-one, N,N-dimethylformamide, N-formyl-morpholine, N,N-dimethyl-imidazolidin-2-one, N-methylimidazole, ethylene glycol, diethylene glycol, triethylene glycol, thiodiglycol, propylene carbonate, tributylphosphate.

Nature of the Gaseous Effluents

The absorbing solutions comprising at least one nitrogen-containing compound in accordance with the invention may be employed to deacidify the following gaseous effluents: natural gas, synthesis gases, refinery gases, acid gases obtained from an amines unit, gases obtained from a Claus process tail reduction unit, or biomass fermentation gases. These gaseous effluents contain one or more of the following acid compounds: $CO_2$, $H_2S$, mercaptans (for example methylmercaptan ($CH_3SH$), ethylmercaptan ($CH_3CH_2SH$), propylmercaptan ($CH_3CH_2CH_2SH$)), COS, $CS_2$, $SO_2$.

The deacidification process using the compounds in accordance with the invention may, for example, be employed in order to deacidify a synthesis gas. The synthesis gas contains carbon monoxide CO, hydrogen $H_2$ (generally in a $H_2$/CO ratio equal to 2), steam (generally saturated at the temperature at which the washing is carried out) and $CO_2$ (of the order of ten percent). The pressure is generally in the range 20 to 30 bar, but it may reach 70 bar. It may also contain sulphur-containing impurities ($H_2S$, COS, etc.), nitrogen-containing impurities ($NH_3$, HCN) and halogenated impurities.

The deacidification process using the compounds in accordance with the invention may also be carried out in order to deacidify a natural gas. The natural gas is mainly constituted by gaseous hydrocarbons, but may contain several of the following acid compounds: $CO_2$, $H_2S$, mercaptans, COS, $CS_2$. The content of these acid compounds may vary widely and may be up to 70% by volume for $CO_2$ and up to 40% by volume for $H_2S$. The temperature of the natural gas may be in the range 20° C. to 100° C. The pressure of the natural gas to be treated may be in the range 10 to 200 bar. The invention may be carried out in order to comply with the specifications generally imposed on the deacidified gas, which are less than 2% $CO_2$, less than 4 ppm $H_2S$, and less than 50 ppm, or even less than 10 ppm by volume of total sulphur.

Process for the Elimination of Acid Compounds in a Gaseous Effluent

The process for the selective elimination of $H_2S$ from a gaseous effluent containing $CO_2$ comprises a step for absorption of the acid compounds, namely $H_2S$ and $CO_2$, by bringing the gaseous effluent into contact with an absorbing solution in accordance with the invention.

Referring to FIG. 1, the absorption step consists of bringing the gaseous effluent 1 into contact with the absorbing solution 4. The gaseous effluent 1 is introduced into the bottom of the absorption column C1; the absorbing solution is introduced into the head of the column C1. The column C1 is provided with gas/liquid contacting means, for example a loose packing, a structured packing or distillation trays. During contact, the amine functions of the molecules of the absorbing solution react with the acid compounds contained in the effluent in a manner such as to obtain a gaseous effluent 2 which is depleted in acid compounds, in particular depleted in $H_2S$ and $CO_2$, and evacuated from the head of the column C1, and an absorbing solution 3 which is enriched in these same acid compounds, evacuated from the bottom of the column C1, preferably in order to be regenerated.

The step for selective absorption of $H_2S$ may be carried out at a pressure in the absorption column C1 which is in the range 1 bar to 200 bar, preferably in the range 20 bar to 100 bar, for the treatment of a natural gas, and at a temperature in the absorption column C1 which is in the range 20° C. to 100° C., preferably in the range 30° C. to 90° C., or even in the range 30° C. to 60° C.

The use of a nitrogen-containing compound in accordance with the general formula (I), added to the aqueous solution comprising hindered tertiary or secondary amines in accordance with the invention, means that a selective absorption of $H_2S$ compared with $CO_2$ can be obtained which is greater than that obtained with solutions comprising the same amines without the nitrogen-containing compound having general formula (I). The increase in the dynamic viscosity caused by adding the compound in accordance with the invention has the effect of reducing the absorption of $CO_2$ relative to that of $H_2S$ in a much better manner than when a prior art viscosifying compound is added.

The absorption step may be following by a step for regeneration of the absorbing solution enriched in acid compounds, for example as shown diagrammatically in FIG. 1.

The regeneration step in particular consists of heating and optionally of flashing the absorbing solution enriched in acid compounds in order to liberate the acid compounds in the gaseous form. The absorbing solution 3 enriched in acid compounds is introduced into the heat exchanger E1 where it is heated up by the stream 6 originating from the regeneration column C2. The heated solution 5 leaving the exchanger E1 is introduced into the regeneration column C2.

The regeneration column C2 is equipped with internal means for contact between gas and liquid, for example trays, or loose or structured packings. The bottom of the column C2 is equipped with a reboiler R1 which supplies the heat necessary for regeneration by vaporizing a fraction of the absorbing solution. In the column C2, under the effect of contact of the absorbing solution 5 with the steam produced by the reboiler, the acid compounds are liberated in the gaseous form and evacuated from the head of the column C2 via the conduit 7. The regenerated absorbing solution 6, i.e. depleted in acid compounds, is cooled in the exchanger E1. The cooled solution 4 is then recycled to the absorption column C1.

The regeneration step in the process in accordance with the invention may be carried out by thermal regeneration, optionally supplemented by one or more decompression steps. As an example, the absorbing solution 3 enriched in acid compounds may be sent to a first flash drum (not shown) before it is passed into the heat exchanger E1. In the case of a natural gas, the flash can be used to obtain a gas evacuated at the top of the drum containing the major portion of aliphatic hydrocarbons co-absorbed by the absorbing solution. This gas may optionally be washed with a fraction of the regenerated absorbing solution, and the gas obtained in this manner may be used as a fuel gas. The flash drum is preferably operated at a pressure which is lower than that of the absorption column C1 and higher than that of the regeneration column C2. This pressure is generally fixed by the conditions for use of the fuel gas, and is typically of the order of 5 to 15 bar. The flash drum is operated at a temperature which is substantially identical to that of the absorbing solution obtained at the bottom of the absorption column C1.

The regeneration may be carried out at a pressure in the column C2 which is in the range 1 bar to 5 bar, or even up to 10 bar, and at a temperature in the column C2 which is in the range 100° C. to 180° C., preferably in the range 110° C. to 170° C., more preferably in the range 110° C. to 140° C. Preferably, the regeneration temperature in the regeneration column C2 is in the range 155° C. to 180° C. in the case in which acid gases are to be re-injected. Preferably, the regeneration temperature in the regeneration column C2 is in the range 115° C. to 130° C. in the case in which the acid gas is sent into the atmosphere or to a downstream treatment process, such as a Claus process or a tail gas treatment process.

Advantageously, the process in accordance with the invention may be used to reduce the energy requirements for regeneration of the absorbing solution, in that the improvement in the selectivity reduces the quantity of captured $CO_2$, the heat of absorption of $CO_2$ generally being in the range 50 to 80 kJ/mole.

EXAMPLES

In the following examples, the term "product in accordance with the invention" is used to mean any compound or mixture of compounds in accordance with the invention.

The examples below illustrate, in a non-limiting manner, the synthesis of the compounds in accordance with the invention (Examples 1 to 5) as well as some of the performances of these compounds when they are used in aqueous solution for the selective elimination of $H_2S$ compared with the $CO_2$ contained in a gaseous effluent by bringing the gaseous effluent into contact with the solution.

Example 1: Synthesis of Product A in Accordance with the Invention 11.0 g of piperazine was reacted with 40.0 g of a polyethylene glycol diglycidylether with a mass average molar mass of 400 g/mole, at 100° C. for 5 hours, then the medium was diluted, at 50° C., with 50.0 g of ethanol. After cooling to ambient temperature, 7.6 g of 1,2-epoxypropane was introduced, then the reaction was continued, with stirring, for 2 hours at ambient temperature. After evaporating the excess 1,2-epoxypropane and ethanol off under reduced pressure, 54.0 g of a highly viscous product, product A, was obtained which had a concentration of amine functions which was estimated to be 4.7 mole/kg of product A. The concentration of amine functions was estimated on the basis of the material balance.

Example 2: Synthesis of Product B in Accordance with the Invention 9.65 g of piperazine was reacted with 40.0 g of a polyethylene glycol diglycidylether with a mass average molar mass of 400 g/mole, at 100° C. for 5 hours, then the medium was diluted, at 50° C., with 50.0 g of ethanol. After cooling to ambient temperature, 5.8 g of 1,2-epoxypropane was introduced, then the reaction was continued, with stirring, for 2 hours at ambient temperature. After evaporating the excess 1,2-epoxypropane and ethanol off under reduced pressure, 52.0 g of a highly viscous product, product B, was obtained which had a concentration of amine functions which was estimated to be 4.3 mole/kg of product B. The concentration of amine functions was estimated on the basis of the material balance.

Example 3: Synthesis of Product C in Accordance with the Invention 8.0 g of piperazine was reacted with 40.0 g of a polyethylene glycol diglycidylether with a mass average molar mass of 400 g/mole, at 100° C. for 5 hours, then the medium was diluted, at 50° C., with 50.0 g of ethanol. After cooling to ambient temperature, 5.0 g of 1,2-epoxypropane was introduced, then the reaction was continued, with stirring, for 2 hours at ambient temperature. After evaporating the excess 1,2-epoxypropane and ethanol off under reduced pressure, 49.3 g of a highly viscous product, product C, was obtained which had a concentration of amine functions which was estimated to be 3.8 mole/kg of product C. The concentration of amine functions was estimated on the basis of the material balance.

Example 4: Synthesis of Product D in Accordance with the Invention 7.5 g of piperazine was reacted with 35.6 g of a polyethylene glycol diglycidylether with a mass average molar mass of 400 g/mole, at 100° C. for 5 hours, then the medium was diluted, at 50° C., with 50.0 g of ethanol. After cooling to ambient temperature, 3.2 g of 1,2-epoxypropane was introduced, then the reaction was continued, with stirring, for 2 hours at ambient temperature. After evaporating the excess 1,2-epoxypropane and ethanol off under reduced pressure, 48.2 g of a highly viscous product, product D, was obtained which had a concentration of amine functions which was estimated to be 3.6 mole/kg of product D. The concentration of amine functions was estimated on the basis of the material balance.

Example 5: Synthesis of Product E in Accordance with the Invention 14.4 g of piperazine was reacted with 40.0 g of a 1,4-butanediol diglycidylether with an epoxy index in the range 120 to 130 g/epoxy equivalent, at 100° C. for 5 hours, then the medium was diluted, at 50° C., with 50.0 g of ethanol. After cooling to ambient temperature, 5.5 g of 1,2-epoxypropane was introduced, then the reaction was continued, with stirring, for 2 hours at ambient temperature. After evaporating the excess 1,2-epoxypropane and ethanol off under reduced pressure, 53.5 g of a highly viscous product, product E, was obtained which had a concentration of amine functions which was estimated to be 6.3 mole/kg of product E. The concentration of amine functions was estimated on the basis of the material balance.

Example 6: Rate of Absorption of $CO_2$ of an Amine Formulation for a Selective Absorption Process Comparative $CO_2$ absorption tests were carried out using various absorbing solutions:
- an aqueous solution of N-methyldiethanolamine (MDEA) in a concentration of 45.75% by weight of MDEA, which constituted a reference absorbing solution for a selective elimination during gas treatment;
- an aqueous solution of MDEA in a concentration of 45.75% by weight, containing 5% by weight of polyethylene glycol (PEG) with a molecular mass of 35 000 g/mol, which was a viscosifying compound described in the document FR 2 996 464;
- an aqueous solution of MDEA in a concentration of 45.00% by weight, containing 10% by weight of product B in accordance with the invention;
- an aqueous solution of MDEA in a concentration of 45.75% by weight, containing 5% by weight of product C in accordance with the invention.

For each test, the rate of $CO_2$ absorption by the aqueous absorbing solution was measured in a closed reactor of the Lewis cell type. 200 g of solution was introduced into the closed reactor adjusted to a temperature of 45° C. Four successive injections of $CO_2$ of 100 to 200 mbar were carried out into the vapour phase of a reactor with a volume of 200 cm³. The gas phase and the liquid phase were stirred respectively at 100 rpm and at 120 rpm, and were entirely characterized from the hydrodynamic viewpoint. For each injection, the rate of absorption of $CO_2$ was measured by variation of pressure in the gas phase. In this manner, an overall transfer coefficient Kg was measured by a mean of the results obtained for the four injections.

The results are presented in Table 1 below, as the relative rate of absorption with respect to the reference aqueous absorbing solution comprising 45.75% by weight of MDEA. The relative rate of absorption is defined as the ratio of the overall transfer coefficient of the tested absorbing solution to the overall transfer coefficient of the reference absorbing solution (with MDEA).

The dynamic viscosity of the various amine solutions at 45° C. was obtained with the aid of an automatic LOVES 2000M viscosimeter from Anton Paar, operating in accordance with the Höppier viscosimeter principle. The viscosity was deduced from the measurement of the time for a steel ball to fall in a capillary with a diameter of 1.59 mm (principal range from 1 to 20 mPa·s, extended range from 0.3 to 90 mPa·s) inclined at various angles, in accordance with DLN standard 53015 and ISO standard 12058, as well as the measurement of the density of the amine solutions obtained using an Anton Paar DMA 4100 densimeter at 45° C.

TABLE 1

| Formulation | Concentration of amine (% by wt) | Concentration of amine functions (mol/kg) | Viscosity at 45° C. (mPas) | Relative rate of $CO_2$ absorption at 45° C. |
|---|---|---|---|---|
| MDEA 45.75% by weight (reference) | 45.75 | 3.84 | 3.5 | 1.0 |
| MDEA, 45.75% by weight with 5% by weight of PEG 35000 (in accordance with the document FR2996464) | 45.75 | 3.84 | 17.9 | 0.73 |
| MDEA, 45% by weight with 10% by weight of product B (in accordance with the invention) | 55.0 | 4.21 | 13.8 | 0.58 |
| MDEA, 45.75% by weight with 5% by weight of product C (in accordance with the invention) | 50.75 | 4.03 | 9.9 | 0.69 |

An examination of the results shows, for the formulation in accordance with the invention, a rate of $CO_2$ absorption which was slower than for the reference formulation.

It can also be seen that adding product B or respectively product C to a solution of MDEA, respectively containing 45.0% by weight and 45.75% by weight of MDEA, reduces the
$CO_2$ absorption kinetics by 42%, respectively 31%, as opposed to 27% when adding 5% by weight of PEG 35 000 in accordance with the teaching of the prior art. This result is all the more surprising given that, in the case of the formulation in accordance with the prior art, the viscosity is higher and the concentration of amine functions is lower than in the formulation in accordance with the invention.

Thus, it appears that the products B and C exemplified in the invention are astonishingly of particular and improved importance in the case of a selective deacidification of a gaseous effluent in which the absorption kinetics of $CO_2$ are to be limited.

Example 7: $H_2S$ Absorption Capacity for Formulations of MDEA and Product C for a Process for the Treatment of Acid Gases The $H_2S$ absorption capacity performance at 40° C. of an aqueous solution of MDEA and of the product A in accordance with the invention, containing 45.75% by weight of MDEA and 5% by weight of product C, were compared with those of an aqueous solution of MDEA containing 50% by weight of MDEA, which constituted a reference absorbing solution for the deacidification of gas containing $H_2S$.

An absorption test was carried out at 40° C. on aqueous amine solutions in a cell which was equilibrated and thermostatted. This test consisted of injecting into the equilibrated cell, which had already been filled with a degassed aqueous amine solution, a known quantity of acid gas, in this example $H_2S$, then waiting for equilibrium to be reached. The quantities of acid gas absorbed in the aqueous amine solution were then deduced from the temperature and pressure measurements by using material and volume balances. The solubilities were represented, as is conventional, in the form of partial pressures of $H_2S$ (in bar) as a function of the loading level of $H_2S$ (in mol $H_2S$/kg of absorbing solution and in mol of $H_2S$/mol of MDEA).

In the case of deacidification by treating natural gas, the partial pressures of $H_2S$ encountered in the acid gases were typically in the range 0.1 to 1 bar, at a temperature of 40° C. By way of example, on this industrial scale, Table 2 below compares the loading level of $H_2S$ obtained at 40° C. for different partial pressures of $H_2S$ between the 50% by weight MDEA absorbing solution and the absorbing solution in accordance with the invention.

TABLE 2

| Formulation Partial pressure of $H_2S$ (bar) | MDEA, 50% by weight (reference) | | MDEA, 45.75% by weight with 5% by weight of product C in accordance with the invention | |
|---|---|---|---|---|
| | Loading level of $H_2S$ (mol/mol of MDEA) | Loading level of $H_2S$ (mol/kg) | Loading level of $H_2S$ (mol/mol of MDEA) | Loading level of $H_2S$ (mol/kg) |
| 0.1 | 0.21 | 0.88 | 0.23 | 0.90 |
| 0.3 | 0.40 | 1.71 | 0.47 | 1.80 |
| 1 | 0.69 | 2.91 | 0.76 | 2.90 |

At 40° C., for partial pressures of $H_2S$ of 1 bar or less, the absorption capacity of the aqueous solution of MDEA and product A in accordance with the invention was equivalent to or higher than that of the reference solution of MDEA.

Thus, it can be seen that the absorbing solution in accordance with the invention has an $H_2S$ absorption capacity which is equivalent to or higher than the reference aqueous solution of MDEA in the range of partial pressures of $H_2S$ in the range 0.1 to 1 bar, corresponding to a range of partial pressures representative of the usual industrial conditions.

As illustrated in the preceding example, the absorption of $CO_2$ is slower in the aqueous solution in accordance with the invention than in a reference aqueous solution of MDEA. In addition, the $H_2S$ absorption capacity for the absorbing solutions in accordance with the invention compared with reference MDEA solutions is equivalent to or higher for a partial pressure of $H_2S$ of 0.1-1 bar, as illustrated in the present example. Thus, it appears that the product exemplified in the invention is of particular importance in improving the $H_2S$ absorption selectivity compared with $CO_2$ and in reducing the flow rates of absorbing solution to be employed in selective deacidification applications ($H_2S$ as opposed to $CO_2$), i.e. of absorbing a given flow rate of $H_2S$ while reducing the flow rate of co-absorbed $CO_2$ compared with the reference MDEA absorbing solution.

The invention claimed is:

1. A nitrogen-containing compound belonging to the polyamine family, obtained from the reaction between a polyol diglycidylether and piperazine, and having the following general formula (I):

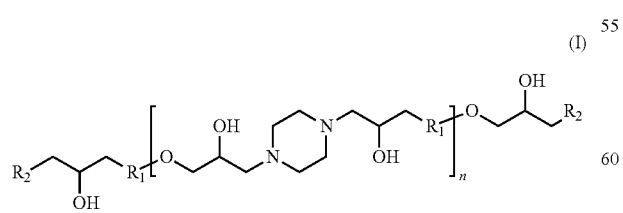

(I)

in which:
n is a whole number in the range 0 to 30,
the radical $R_1$ is selected from the groups with the following sub-formulae ($g_1$) to ($g_4$):

the group with formula ($g_1$):

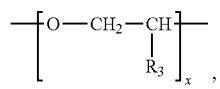

in which:
x is a whole number in the range 1 to 100, preferably in the range 1 to 25,
the radical $R_3$ is equally either a hydrogen atom, an alkyl radical or a hydroxyalkyl radical, containing between 1 and 4 carbon atoms,
the group with formula ($g_2$):

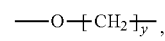

in which y is a whole number in the range 3 to 8,
the group with formula ($g_3$):

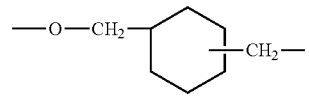

the group with formula ($g_4$):

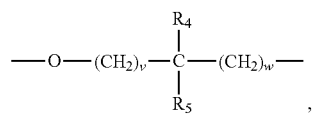

in which:
v and w are whole numbers, each in the range 1 to 4, with the condition that the sum of v and w is equal to 2, 3, 4 or 5,
the radical $R_4$ is equally either a hydroxyl group, an alkyl radical or a hydroxyalkyl radical, containing between 1 and 4 carbon atoms, and
the radical $R_5$ is equally either a hydrogen atom or a hydroxymethyl group (—$CH_2OH$),
the radical $R_2$ has the following formula ($g_5$):

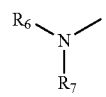

in which:
the radical $R_6$ is equally either a hydrogen atom, an alkyl radical or a hydroxyalkyl radical, containing between 1 and 6 carbon atoms,
the radical $R_7$ is equally either an alkyl radical or a hydroxyalkyl radical, containing between 1 and 6 carbon atoms,
the radicals $R_6$ and $R_7$ may be connected together via a covalent bond or via a heteroatom in order to form a heterocycle having 5, 6, 7 or 8 atoms when the radical $R_6$ is not a hydrogen atom,
and in which, when n is equal to 0, the radicals $R_6$ and $R_7$ are connected together to form a piperazine cycle, the radical $R_2$ having the formula ($g_6$) below:

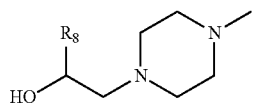

in which the radical $R_8$ is equally either a hydrogen atom, an alkyl radical or hydroxyalkyl radical, containing between 1 and 4 carbon atoms.

2. The compound as claimed in claim 1, in which the radicals $R_6$ and $R_7$ are connected together via a covalent bond or via a heteroatom in order to form a heterocycle having 5, 6, 7 or 8 atoms when the radical $R_6$ is not a hydrogen atom.

3. The compound as claimed in claim 2, in which the heterocycle is a piperazine cycle.

4. The compound as claimed in claim 3, in which the radical $R_2$ has the formula ($g_6$).

5. A process for the synthesis of a nitrogen-containing compound as claimed in claim 1, comprising the following reactions:
   a first reaction for addition or polyaddition of a polyol diglycidylether having formula (IV) with piperazine having formula (V) in order to form an intermediate compound having formula (VI),

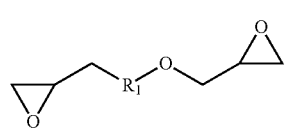

(IV)

(V)

$R_1$ being as defined in the general formula (I),
said piperazine being in molar excess with respect to said polyol diglycidylether,
   a second reaction for addition of said intermediate compound having formula (VI) with monoepoxide having general formula (VII)

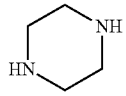

(VII)

in order to produce said at least one nitrogen-containing compound.

6. A process for the synthesis of a nitrogen-containing compound as claimed in claim 1, comprising the following reactions:
   a first reaction for addition or polyaddition of a polyol diglycidylether having formula (IV) with piperazine having formula (V) in order to form an intermediate compound having formula (VIII), (IV)

(V)

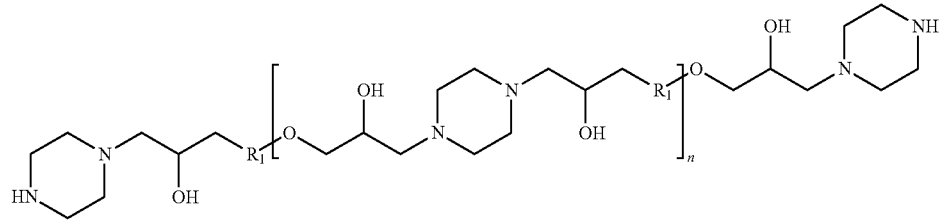

(VIII)

$R_1$ being as defined in the general formula (I), said polyol diglycidylether being in molar excess with respect to said piperazine,
   a second reaction for addition of said intermediate compound having formula (VIII) with an amine having general formula (IX)

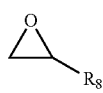

(IX)

the radicals $R_6$ and $R_7$ being as defined in the general formula (I), in order to produce at least the one nitrogen-containing compound.

7. The synthesis process as claimed in claim 5, in which the first reaction and the second reaction are carried out in two successive steps.

8. The synthesis process as claimed in claim 5, in which the first reaction and the second reaction are carried out in a single step.

9. The synthesis process as claimed in claim 5, in which the polyol diglycidylether having formula (IV) for the first reaction is selected from the list constituted by:
   ethylene glycol diglycidylether;
   diethylene glycol diglycidylether;
   triethylene glycol diglycidylether;
   polyethylene glycol diglycidylether with a molar mass in the range 200 to 2000 g/mole;

the diglycidylether of copolymers of ethylene glycol and propylene glycol with a molar mass in the range 200 to 2000 g/mole;
1,3-propanediol diglycidylether;
1,4-butanediol diglycidylether;
1,5-pentanediol diglycidylether;
1,6-hexanediol diglycidylether;
1,8-octanediol diglycidylether;
neopentylglycol diglycidylether;
1,4-cyclohexanedimethanol diglycidylether;
1,3-cyclohexanedimethanol diglycidylether;
1,2-cyclohexanedimethanol diglycidylether;
glycerol diglycidylethers;
trimethylolethane diglycidylethers;
trimethylolpropane diglycidylethers;
pentaerythritol diglycidylethers;
sorbitol diglycidylethers.

10. The synthesis process as claimed in claim 6, in which the secondary amine having formula (IX) is selected equally from the group constituted by:
dimethylamine;
diethylamine;
2-amino-2-methyl-1-propanol;
tris(hydroxymethyl)aminomethane;
morpholine;
N-methylpiperazine;
N-hydroxyethylpiperazine;
N-2-hydroxypropylpiperazine;
diethanolamine;
N-methylaminoethanol.

11. The synthesis process as claimed in claim 5, in which the monoepoxide having formula (VII) is selected equally from the group constituted by:
1,2-epoxyethane;
1,2-epoxypropane;
1,2-epoxybutane;
glycidol.

12. A selective process for the elimination of $H_2S$ compared with $CO_2$ from a gaseous effluent comprising $H_2S$ and $CO_2$, in which a step for absorption of the acid compounds is carried out by bringing the gaseous effluent into contact with an absorbing solution comprising:
(a) water,
(b) at least one principal nitrogen-containing compound comprising at least one tertiary amine function or secondary amine function comprising two secondary carbons in the $\alpha$ and $\alpha'$ position of the nitrogen atom or at least one tertiary carbon in the alpha or beta position of the nitrogen atom, and
(c) at least one auxiliary nitrogen-containing compound as claimed in claim 1.

13. The process as claimed in claim 12, in which the absorbing solution comprises:
a fraction by weight of water in the range 3.5% to 94.5% by weight of the absorbing solution, preferably in the range 39.5% to 79.5% by weight,
a fraction by weight of the principal nitrogen-containing compound in the range 5% to 95% by weight of the absorbing solution, preferably in the range 20% to 60% by weight,
a fraction by weight of the auxiliary nitrogen-containing compound in the range 0.5% to 25% by weight of the absorbing solution, preferably in the range 1% to 10% by weight, the fraction by weight of the principal nitrogen-containing compound being higher than that of the auxiliary nitrogen-containing compound.

14. The process as claimed in claim 12, in which the principal nitrogen-containing compound is selected from the group constituted by:
N-methyldiethanolamine;
triethanolamine;
diethylmonoethanolamine;
dimethylmonoethanolamine;
ethyldiethanolamine;
tertiary monoalkanolamines of the family of 3-alkoxypropylamines from the list constituted by N-methyl-N-(3-methoxypropyl)-2-aminoethanol, N-methyl-N-(3-methoxypropyl)-1-amino-2-propanol, N-methyl-N-(3-methoxypropyl)-1-amino-2-butanol, N-ethyl-N-(3-methoxypropyl)-2-aminoethanol, N-ethyl-N-(3-methoxypropyl)-1-amino-2-propanol, N-ethyl-N-(3-methoxypropyl)-1-amino-2-butanol, N-isopropyl-N-(3-methoxypropyl)-2-aminoethanol, N-isopropyl-N-(3-methoxypropyl)-1-amino-2-propanol, and N-isopropyl-N-(3-methoxypropyl)-1-amino-2-butanol;
diamines from the list constituted by 1,2-bis(2-dimethylaminoethoxy)ethane, 1,2-bis(2-diethylaminoethoxy)ethane and 1,2-bis(2-pyrolidinoethoxy)ethane;
diamines of the 1,3-diamino-2-propanol family from the list constituted by 1,3-bis(dimethylamino)-2-propanol, (1-dimethylamino-3-tert-butylamino)-2-propanol, 1,3-bis(tert-butylamino)-2-propanol, 1,3-bis(diethylamino)-2-propanol, 1,3-bis(methylamino)-2-propanol, 1,3-bis(ethylmethylamino)-2-propanol, 1,3-bis(n-propylamino)-2-propanol, 1,3-bis(isopropylamino)-2-propanol, 1,3-bis(n-butylamino)-2-propanol, 1,3-bis(isobutylamino)-2-propanol, 1,3-bis(piperidino)-2-propanol, 1,3-bis(pyrrolidino)-2-propanol and N,N,N'-trimethyl-N'-hydroxyethyl-1,3-diamino-2-propanol;
dihydroxyalkylamines from the list constituted by N-(2'-hydroxyethyl)-2-amino-2-methyl-1-propanol, N-(2'-hydroxypropyl)-2-amino-2-methyl-1-propanol, N-(2'-hydroxybutyl)-2-amino-2-methyl-1-propanol, (N-methyl-N-hydroxyethyl)-3-amino-2-butanol;
diamines of the family of bis(amino-3-propyl)ethers or (amino-2-ethyl)-(amino-3-propyl)ethers from the list constituted by bis(dimethylamino-3-propyl)ether, bis(diethylamino-3-propyl) ether, (dimethylamino-2-ethyl)-(dimethylamino-3-propyl) ether, (diethylamino-2-ethyl)-(dimethylamino-3-propyl) ether, (dimethylamino-2-ethyl)-(diethylamino-3-propyl) ether, (diethylamino-2-ethyl)-(diethylamino-3-propyl) ether;
beta-hydroxylated tertiary diamines from the list constituted by 1-dimethylamino-3-(2-dimethylaminoethoxy)-2-propanol, 1,1'-oxybis[3-(dimethylamino)-2-propanol], N,N,N',N'-(tetramethyl)-1,6-diamino-2,5-hexanediol, N,N,N',N'-(tetramethyl)-1,7-diamino-2,6-heptanediol, N,N,N',N'-(tetramethyl)-1,8-diamino-2,7-octanediol, N,N,N',N'-(tetramethyl)-1,9-diamino-2,8-nonanediol, N,N,N',N'-(tetramethyl)-1,10-diamino-2,9-decanediol;
di-(2-hydroxyalkyl) monoamines from the list constituted by 1-[(2-hydroxyethyl)methylamino]-2-methyl-2-propanol, 1,1'-(methylimino)-bis-[2-methyl-2-propanol], 2-[(2-hydroxy-2-methylpropyl)amino]-2-methyl-1-propanol, 2-[(2-hydroxy-2-methylpropyl)amino]-1-butanol, bis(2-hydroxy-2-methylpropyl)amine;
hindered tertiary 4-(aminoethyl)-morpholines from the list constituted by 1-(4-morpholino)-2-(methylisopropylamino) ethane, 1-(4-morpholino)-2-(methyltert-butylamino) ethane, 1-(4-morpholino)-2-(diisopropylamino) ethane, 1-(4-morpholino)-2-(1-piperidinyl) ethane;

diamines from the list constituted by (N-morpholinoethyl) isopropylamine, (N-piperidinoethyl) isopropylamine, (N-morpholinoethyl) tert-butylamine;

amines from the family of N-alkyl-3-hydroxypiperidines and N-alkyl-4-hydroxypiperidines from the list constituted by N-methyl-4-hydroxypiperidine, N-ethyl-3-hydroxypiperidine, N-methyl-3-hydroxypiperidine;

alkylaminopiperazines, namely 1-methyl-4-(3-dimethylaminopropyl) piperazine, 1-ethyl-4-(diethylaminoethyl) piperazine.

15. The process as claimed in claim 12, in which the absorbing solution further comprises a physical solvent selected from the group constituted by methanol, ethanol, 2-ethoxyethanol, benzyl alcohol, triethylene glycol dimethylether, tetraethylene glycol dimethylether, pentaethylene glycol dimethylether, hexaethylene glycol dimethylether, heptaethylene glycol dimethylether, octaethylene glycol dimethylether, diethylene glycol butoxyacetate, glycerol triacetate, sulpholane, N-methylpyrrolidone, N-methylmorpholin-3-one, N,N-dimethylformamide, N-formyl-morpholine, N,N-dimethyl-imidazolidin-2-one, N-methylimidazole, ethylene glycol, diethylene glycol, triethylene glycol, thiodiglycol, tributylphosphate, and propylene carbonate.

16. The process as claimed in claim 12, in which the gaseous effluent is selected from natural gas, synthesis gases, refinery gases, acid gases obtained from an amines unit, gases obtained from a Claus process tail reduction unit, biomass fermentation gases.

* * * * *